United States Patent [19]

Hamada et al.

[11] 4,413,904

[45] Nov. 8, 1983

[54] ELECTRO-OPTICAL RANGE FINDER USING THREE MODULATION FREQUENCIES

[75] Inventors: Toshio Hamada; Fumio Ohtomo, both of Tokyo, Japan

[73] Assignee: Tokyo Kogaku Kikai Kabushiki Kaisha, Tokyo, Japan

[21] Appl. No.: 240,256

[22] Filed: Mar. 4, 1981

[30] Foreign Application Priority Data

Mar. 10, 1980 [JP] Japan ............................ 55-30123

[51] Int. Cl.³ .................... G01C 3/08; G01S 13/08; G01S 13/26
[52] U.S. Cl. ................................. 356/5; 343/12 R; 343/14
[58] Field of Search ............... 356/5; 343/12 R, 14

[56] References Cited

U.S. PATENT DOCUMENTS

| | | | |
|---|---|---|---|
| 3,778,159 | 12/1973 | Hines et al. | 356/5 |
| 3,832,056 | 8/1974 | Shipp et al. | 356/5 |
| 3,900,259 | 8/1975 | Mott et al. | 356/5 |
| 4,146,328 | 3/1979 | Hullein et al. | 356/5 |
| 4,171,907 | 10/1979 | Hill et al. | 356/5 |

Primary Examiner—S. C. Buczinski
Attorney, Agent, or Firm—Brumbaugh, Graves, Donohue & Raymond

[57] ABSTRACT

An electro-optical range finder using three modulation frequencies for providing light beams to be projected. The device is characterized by the fact that the highest frequency is not an approximation to the other two frequencies but the other two frequencies are approximation to each other.

4 Claims, 1 Drawing Figure

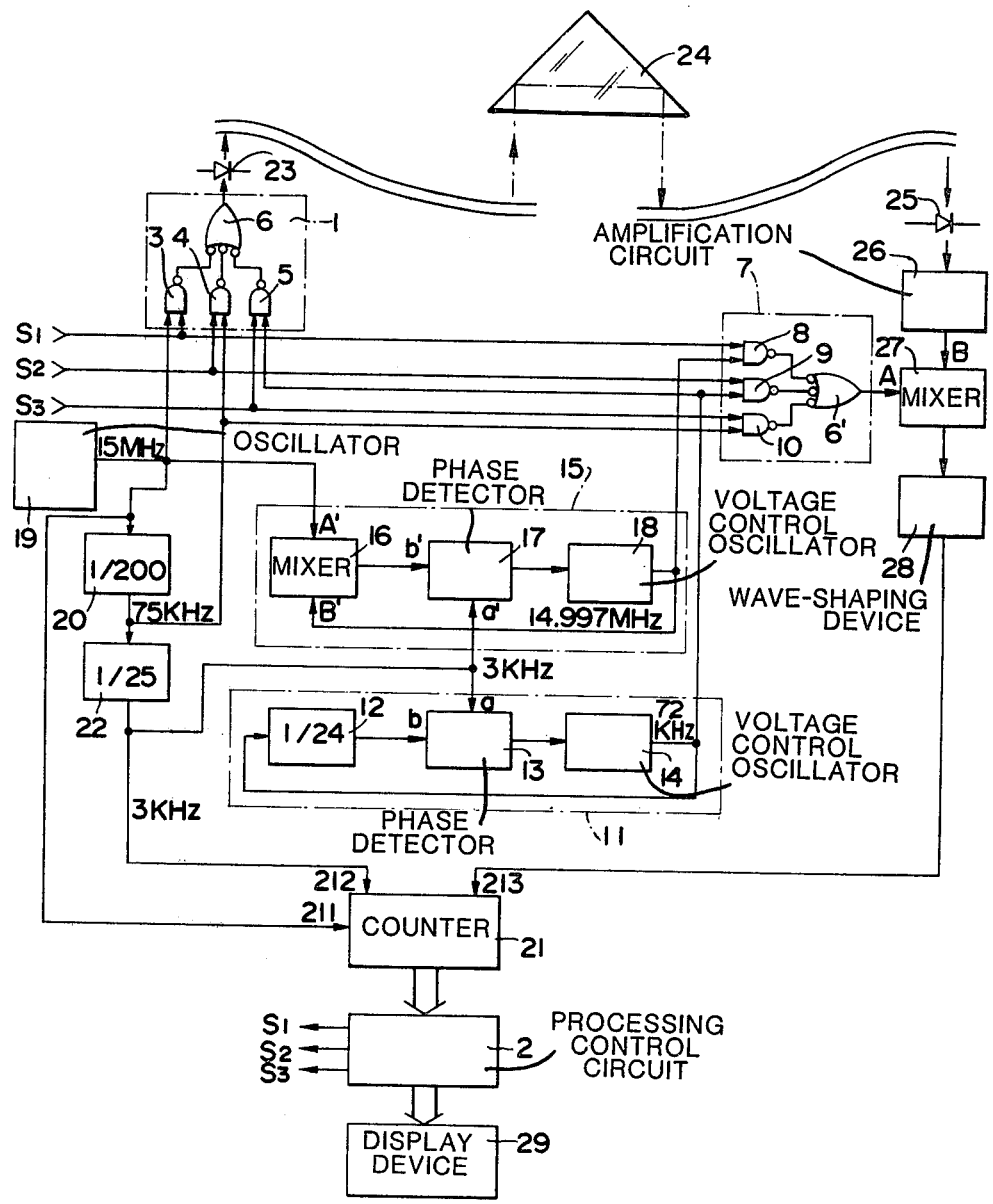

ELECTRO-OPTICAL RANGE FINDER USING THREE MODULATION FREQUENCIES

This invention relates to an electro-optical distance measuring device or range finder using three modulation frequencies. Such distance measuring device consists of a body for projecting a modulated light beam toward an object which is usually comprised of a reflector. The light beam is reflected at the reflector and received by the body. The phase difference between the radiated modulated wave and the returning modulated wave corresponds to the distance between the points of which the body and the reflector is located so that the distance can be calculated by measuring the phase diffence. In order to carry out measurement with a high level of accuracy in this type of device, it is necessary to use a modulated wave of a short wavelength. To obtain a measuring accuracy of about ±5 mm, for example, a light beam of a first wavelength $\lambda_1$ of 20 m is used to carry out a fine measurement. In this case, however, the relationship between the distance to be measured and the phase is such that the phase cyclically changes from 0 to $2\pi$ in its period as the distance to be measured increases by 10 m. Accordingly, it is impossible to carry out a measurement of a range exceeding 10 m. It is therefore necessary to carry out rough measurement over a measuring period longer than that employed in fine measurement. Furthermore, very rough measurement over a measuring period longer than that used in rough measurement is carried out in order to make long-range measurements. The results of fine measurement, rough measurement and very rough measurement are synthesized to obtain the final measured result. The electro-optical range finder using these three modulated waves is in the art. Methods of using such three modulated waves include a non-approximation wavelength method and an approximation wavelength method.

When the first wavelength $\lambda_1$ of 20 m is to be used, the non-approximation wavelength method employs a second wavelength $\lambda_2$ of 4 km for rough measurement and third wavelength $\lambda_3$ of 100 km for the very rough measurement. On the other hand, in the approximation wavelength method, the relation among the distance L to be measured, the phase $\theta_1$ and the first wavelength $\lambda_1$, i.e., 20 m, is given by $$\theta_1 = \frac{2\pi}{\lambda_1/2} L = \frac{2}{10} \pi L \quad (1)$$

Similarly, when $\lambda_2 = 20.2$ m is used as the second wavelength, the phase $\theta_2$ is given by the following equation:

$$\theta_2 = \frac{2\pi}{\lambda_2/2} L = \frac{2}{10.1} \pi L \quad (2)$$

The difference between $\theta_1$ and $\theta_2$ is given as follows:

$$\theta_{1.2} = \theta_1 - \theta_2 = \left(\frac{1}{10} - \frac{1}{10.1}\right) \cdot 2\pi L = \frac{1}{1010} 2\pi L \quad (3)$$

Accordingly, $\theta_{1.2}$ is the same as the phase when the measurement is carried out using a wavelength $2 \times 1010$ m = 2.02 km. This is employed for the rough measurement.

Further, when $\lambda_3 = 20.004$ m is used as the third wavelength, the phase $\theta_3$ is given as follows:

$$\theta_3 = \frac{2\pi}{\lambda_3/2} \cdot L = \frac{1}{10.002} \cdot 2\pi L \quad (4)$$

The difference between $\theta_1$ and $\theta_3$ is as follows:

$$\theta_{1.3} = \theta_1 - \theta_3 \left(\frac{1}{10} - \frac{1}{10.002}\right) 2\pi L \quad (5)$$

$$= \frac{1}{50010} \cdot 2\pi L$$

Accordingly, $\theta_{1.3}$ is the same as the phase when a wavelength $2 \times 50010$ m = 100.02 km is used for the measurement. This is employed for the very rough measurement.

The abovementioned non-approximation wavelength method and approximation wavelength method have different characteristics. This will be described by comparing the two methods. First, a case shall be considered in which the distance to be measured varies during a time period from the fine measurement to the rough measurement, or from the rough measurement to the very rough measurement, such as when an operator walks about with the reflector in his hand. In the non-approximation wavelength method, if the change in the distance to be measured during the first wavelength $\lambda_1 = 20$ m, and the rough measurement using the second wavelength $\lambda_2 = 4$ km, is less than ½ of the measuring period of the fine measurement, or 5 m, it is possible to eliminate erroneous measurements in 10 m units by giving priority to the fine measurement over the rough measurement. However, it is not possible practically to determine whether the measured value is 33 m or 43 m when the fine measurement value is 3 m and the rough measurement value is 38 m, by way of example. Similarly, as to the change in the measuring distance between the rough measurement and the very rough measurement using the third wavelength $\lambda_3 = 100$ km, the measurement error can be eliminated if the change in the measuring distance is within ½ of the measuring period of the rough measurement or 1 km.

In the approximation wavelength method, too, when the fine measurement value and the rough measurement value are synthesized, the 10 meter unit measurement error occurs unless the fine measurement value and the rough measurement value are approximate to each other within 5 m. Here, the change in phase in which the result of measurement in the rough measurement exhibits the change of 5 m, is given by the following equation from Eq. (3):

$$\theta_{1.2(5)} = \frac{1}{1010} \cdot 2\pi \cdot 5 = \frac{1}{202} \cdot 2\pi \quad (6)$$

If the change in the measuring distance is $\Delta L$ during a period from the measurement using $\lambda_1 = 20$ m to measurement using $\lambda_2 = 20.2$ m, the following relation results from Eq. (2):

$$\theta'_2 = \frac{1}{10.1} \cdot 2\pi(L + \Delta L) \quad (7)$$

Hence, the phase of the rough measurement is expressed as follows:

$$\theta'_{1,2} = \theta_1 - \theta'_2 = \frac{1}{10} \cdot 2\pi L - \frac{1}{10.1} \cdot 2\pi(L + \Delta L) \quad (8)$$

$$= \frac{1}{1010} \cdot 2\pi L - \frac{1}{10.1} \cdot 2\pi \cdot \Delta L$$

The change in the phase of the rough measurement $\Delta\theta_{1,2}$ due to the change in the measuring distance $\Delta L$ is given as follows from Eqs. (3) and (8):

$$\Delta\theta_{1,2} = \theta_{1,2} - \theta'_{1,2} = \frac{1}{1010} \cdot 2\pi L - \left(\frac{1}{1010} \cdot 2\pi L - \frac{1}{10.1} \cdot 2\pi\Delta L\right) = \frac{2\pi}{10.1} \Delta L \quad (9)$$

In order to avoid the 10-meter unit measurement error, the change in the phase of the rough measurement must be smaller than the change in the phase corresponding to 5 m (from Eq. (6)) and the conditions required therefor are as follows:

$$\Delta\theta_{1,2} < \theta_{1,2(5)}$$

$$\frac{2\pi}{10.1} \Delta L < \frac{1}{202} \cdot 2\pi$$

$$\Delta L < \frac{1}{20} \text{ (m)} = 5 \text{ (cm)}$$

In other words, if the measuring distance changes by more than 5 cm during period from the measurement using $\lambda_1 = 20$ m to the measurement using $\lambda_2 = 20.2$ m, the rough measurement will contain an error of at least 5 m. When the calculation is likewise made for the very rough measurement, if the measuring distance changes by more than 10 cm during period from the measurement with $\lambda_1 = 20$ m to the measurement with $\lambda_3 = 20.004$ m, the very rough measurement will contain an error of at least 500 m. Accordingly, if the measuring distance changes by more than 5 cm during period from the measurement with $\lambda_1 = 20$ m to the measurement with $\lambda_2 = 20.2$ m and more than 10 cm during period from the measurement with $\lambda_1 = 20$ m to the measurement with $\lambda_3 = 20.004$ m, the results of the measurements errors are obtained in the 10 m and 1 km units as a result of the synthesis of these measurements. Thus, for the measurement of a varying measuring distance, the approximation wavelength method is much more disadvantageous than the non-approximation wavelength method. Though this problem can be improved by increasing the number of modulation frequencies, a disadvantageous result would be an increase in the modulation circuits. As another method for solving this problem, is theoretically possible to elongate the wavelength of the modulation frequency, but this would make it necessary to elongate also the wavelength for the fine measurement. In consequence, the accuracy of measurement could not be maintained.

The second difference resides in the number of filters required for the measuring circuits. Since the return signal is weak in the optical wave range finder, the gain of the amplifier must be increased, but this calls for filters for preventing oscillation and noise. In the non-approximation wavelength method, the number of filters required is the same as the number of frequencies. By contrast, in the approximation wavelength methods, a single bandpass filter allowing the passage of all frequencies can be commonly used. Hence, the approximation wavelength method is more advantageous in this respect.

The present invention seeks to provide an electro-optical range finder devoid of the abovementioned defects, which minimizes the occurrence of measurement errors with respect to changes in the measuring distance having advantageous circuit and filter structures, and which is capable of performing long-distance measurements.

In the electro-optical range finder using three modulation frequencies, the first characteristic of the present invention resides in that the first modulation frequency is not approximate to the second and third modulation frequencies. The first frequency has a value different from and higher than by at least one digit, the other frequencies, and the difference between the second and third frequencies are approximate to each other within ±20%. According to this characteristic of the present invention, since the second and third modulation frequencies are in a non-approximate relationship with the first modulation frequency, it is possible to fully exploit the advantage of the non-approximation wavelength method. Although the wavelengths approximate to each other are used as the second and the third modulation frequencies, it is possible in accordance with the present invention to markedly to reduce the occurrence of measurement errors in the approximation wavelength method by use of a lower frequency (that is, a longer wavelength). Consequently, the conditions under which the measurement error for the device as a whole will occurs can be set substantially equal to that of the non-approximation wavelength method. Furthermore, it is possible to exploit the advantage of the approximation wavelength method in that a single common bandpass filter can be used for both second and third frequencies. Thus, the present invention is directed to provide a novel electro-optical range finder which uses three modulated waves, to exploit fully the advantages of both the conventional approximation wavelength method and non-approximation wavelength method.

In the electro-optical range filter, if the emitted wavelengths are different from each other than phase difference detection circuits, in which the phase difference is detected between the modulated wave radiated from the device and the modulated wave received by the device, are needed for each frequency, respectively. This means that the number of phase difference detection circuits needed is the same as the number of different frequencies. Counters are generally used for the phase measurement, but when the frequency of the signal to be measured is high, it becomes difficult to measure the phase with a high level of resolution. For this reason, the conventional range finder uses a mixer so that even when plural modulated waves having mutually different frequencies are received, only one phase detection circuit is sufficient, because after the received modulated wave is converted into an electric signal, it can be converted into a same predetermined low frequency in order to make the measurement possible at a low frequency. In order to produce this predetermined frequency from the mixer, a reference frequency $f_4$ having the relationship $f_c = f_1 - f_4$, where $f_1$ is the frequency of the radiated frequency and $f_c$ the predetermined frequency to be determined, is impressed upon the mixer. Accordingly, it is necessary that a reference signal of a frequency $f_5$ having the relationship $f_2 - f_5 = f_c$ be applied to the mixer when the frequency of the radiated modulated wave is $f_2$, and a reference signal of a frequency $f_6$ having the relationship $f_3 - f_6 = f_c$, when the frequency of the radiated modulated wave is $f_3$. In other words, when the frequencies of the radiated modulated wave are of three kinds, i.e., $f_1$, $f_2$ and $f_3$, the reference signals to be applied to the mixer must also be of three kinds having the frequency of $f_4$, $f_5$ and $f_6$, respectively.

In addition to the abovementioned characteristic, the second characteristic of the present invention to solve the abovementioned conventional problem is as follows. Namely, when the frequency of the electric signal of the predetermined frequency, which is to be generated by the mixer, for detecting the phase is $f_c$, the second frequency of an electric signal for forming the second measuring modulation frequency if $f_2$, and the frequency of an electric signal for forming the third measuring frequency is $f_3$, and these frequencies are so selected as to satisfy the following relationship:

$$f_c = |f_2 - f_3| \tag{10}$$

When the measurement is carried out using the second modulation frequency $f_2$, the third frequency $f_3$ for forming the third modulation frequency is applied to the mixer as the third reference signal, and when the measurement is carried out using the third modulation frequency $f_3$ the second frequency $f_2$ for forming the second modulation frequency is applied to the mixer as the second reference signal. According to this arrangement, the modulation frequencies $f_2$ and $f_3$ can be used as third and second reference signals. Furthermore, when the measurement is carried out using the first modulation frequency $f_1$, the fourth frequency $f_4$ for forming the fourth electric signal satisfying, which is selected to satisfy the following relationship, is applied to the mixer as the fourth reference signal:

$$f_4 = |f_1 \pm f_c| = f_1 \pm |f_2 - f_3| \tag{11}$$

Hence, the present invention can reduce the number of the input reference signals to be applied to the mixer as compared with the number of the frequencies that must be borne by the conventional device as a whole.

On the basis of the abovementioned fundamental principles, and the electro-optical range finder in accordance with one aspect of the present invention includes a first selection circuit for selecting three frequencies for forming the modulated waves to be used for the measurement, a second selection circuit for selecting three frequencies for forming the abovementioned reference signals, and a processing control circuit for generating control signals that provide the following combinations:

(a) when the first selection circuit selects the first frequency $f_1$, the second selection circuit selects the fourth frequency $f_4$;

(b) when the first selection circuit selects the second frequency $f_2$, the second selection circuit selects the third frequency $f_3$; and (c) when the first selection circuit selects the third frequency $f_3$, the second selection circuit selects the second frequency $f_2$;

whereby the frequency selected by the first selection circuit forms the modulation frequency corresponding thereto and the frequency selected by the second selection circuit forms the reference signal corresponding thereto. Accordingly, although the optical wave range finder in accordance with the present invention properly selects the frequency of the electric signals in the number smaller than those of the conventional optical wave range finder and uses three frequencies, it has a simple circuit construction, which is substantially the same as the conventional electro-optical range finder using only two frequencies.

In order that the invention be more clearly understood, descriptions will now be made with reference to the accompanying drawing which shows a block diagram of an electric circuit in accordance with a preferable embodiment of the present invention.

In the electro-optical range finder of the embodiment, three modulated waves are used i.e., a first modulated wave, corresponding to the wavelength $\lambda_1$ of 20 m, of a frequency 15 MHz ($f_1$), a second modulated wave, corresponding to the wavelength $\lambda_2$ of 4 km, of a frequency 75 KHz ($f_2$) and a third modulated wave, corresponding to the wavelength $\lambda_3$ of approximately 4.17 km, of a frequency 72 KHz ($f_3$). Namely, the first modulated wave for the fine measurement and the second modulated wave for the rough measurement are not approximate to each other, but the second and third modulation waves have frequencies that are approximate to each other.

Referring now to the drawing, the circuit shown therein includes a first selection circuit 1 which selects a modulation frequency in accordance with the signals $S_1$, $S_2$ and $S_3$ from the processing control circuit 2. The inputs to a first NAND gate 3 are the signal $S_1$ and 15 MHz. When the signal $S_1$ is logical "1", the NAND gate 3 delivers a 15 MHz output and when the signal $S_1$ is a "0", is blocks 15 MHz output. The inputs to a second NAND gate 4 are the signal $S_2$ and 75 KHz. When the signal $S_2$ is a "1", the NAND gate 4 delivers a 75 KHz output and when the signal $S_2$ is a "0", it blocks the 75 KHz. The inputs to a third NAND gate 5 are the signal $S_3$ and 72 KHz. When the signal $S_3$ is a "1", the NAND gate 5 delivers a 72 KHz output and blocks the 72 KHz output when the signal $S_3$ is a "0". A first NOR gate 6 receives the outputs of the first, second and third NAND gates 3, 4 and 5 and delivers the output frequency provided by these NAND gates. Only one of the signals $S_1$, $S_2$ and $S_3$ from the processing control circuit 2 is a "1", with the others being "0". Accordingly, only one of the signals 15 MHz, 75 KHz and 72 KHz appears at the output of the first NOR gate 6.

The second selection circuit 7 has the same construction as that of the first selection circuit 1. One of the inputs to a fourth NAND gate 8 is 14.997 MHz ($f_4$), and one of the inputs to a fifth NAND gate 9 is 72 KHz. One of the inputs to a sixth NAND gate 10 is 75 KHz. The inputs to the second NOR gate 6' are the outputs of the fourth, fifth and sixth NAND gates 8, 9 and 10, and the NOR gate 6' delivers the output frequency with which it is provided.

A first synthesizer 11 is used for producing the 72 KHz signal. A divider 12, consisting of counters or the like, generates a frequency of 1/24 of the frequency generated by a first voltage control oscillator 14 and delivers the frequency to a first phase detector 13. The first phase detector 13 compares the phase of the input terminal a receiving 3 KHz with that of the input terminal b receiving the signal from the divider 12, and generates a d.c. voltage that changes with the phase difference across the input terminals a and b. The first voltage control oscillator 14 is an oscillator which changes the frequency near 72 KHz in accordance with the change in the output voltage of the first phase detector 13. The synthesizer 11 uses the negative feed-back. Since the 3 KHz frequency is applied to the input terminal a of the first phase detector 13, the first voltage control oscillator 14 is so controlled that the signal applied to the input terminal b is in synchronism with the 3 KHz of the input terminal a. When the signals of both terminals a and b are synchronized with each other, the frequency of the signal applied to the terminal b becomes 3 KHz, and the input signal to the 1/24 divider 12, that is, the output of the first voltage control oscillator 14, becomes 3 KHz×24=72 KHz and is hence in synchronism with both the 3 KHz of input terminals a and b.

A second synthesizer 15 has a construction similar to that of the first synthesizer but includes a first mixer 16 in place of the divider 12. A second voltage control oscillator 18 oscillates near 14.997 MHz. The first mixer 16 generates a frequency equivalent to the difference between the input terminal A' (15 MHz) and the input terminal B'. Accordingly, when the input terminal a' (3 KHz) and the input terminal b' of a second phase detector 17 are in synchronism with each other, the input B' of the first mixer 16, that is to say, the output of the second voltage control oscillator 18, becomes 15 MHz −3 KHz 32 14.997 MHz. In comparison with the first mixer 16, the circuit of the 1/24 divider 12 is simpler. However, synchronization becomes unstable when the number of division of the divider becomes great (the divider must be divided into 4,999 in order for it to be used for the second synthesizer). For this reason, the use of the divider is avoided in the first synthesizer 15.

An oscillator 19 generates a 15 MHz signal and delivers it to the first NAND gate 3, the first mixer 16, a 1/200 divider 20 and to a clock terminal 211 of a counter 21. The 1/200 divider 20 generates a 75 KHz signal obtained by dividing 15 MHz by 200 and feeds the signal to the second NAND gate 4, the sixth NAND circuit 10 and a 1/25 divider 22. The 1/25 divider 22 generates a 3 KHz signal formed by dividing 75 KHz by 25, and delivers the signal to the first phase detector 13, to the second phase detector 17 and to the start terminal 212 of the counter 21. The electric signal of the frequency selected by the first selection circuit 1 is delivered to a light-emitting diode 23, where it is converted into an optical modulated wave of the same frequency, the modulated wave then being radiated towards a reflector 24. The reflector 24, which consists of a prism having three reflecting planes that are orthogonal to one another, functions to reflect an incident ray of light in the same but opposite direction. The modulated wave reflected by the reflector 24 is incident upon a light-receiving diode 25, where it is converted into an electric signal and then fed to an amplification circuit 26. The amplification circuit 26 includes a 15 MHz filter for preventing oscillation and noise, and a 73.5 KHz filter having a band of at least 3 KHz. After being amplified by the amplification circuit 26, the electric signal is delivered to the second mixer 27. The second mixer 27 delivers to a wave-shaping device 28 a signal with the predetermined frequency $f_c$ of 3 KHz which is a difference frequency between the signal applied to input terminal A for receiving the output from the second selection circuit 7 and the signal applied to the input terminal B for receiving the output from the amplification circuit 26. The wave-shaping device 28 converts the input signal, which is a sine wave, into a rectangular wave and delivers it to the stop terminal 213 of the counter 21.

The counter 21, begins counting, in accordance with the rise (or fall) in the 3 KHz signal received at its start terminal 212 from the 1/25 divider 22, the 15 MHz signal in the form of clock pulses received at its clock terminal 211 from the oscillator 19, and stops counting in accordance with the rise (or fall) in the signal received at its stop terminal 213 from the wave-shaping device 28. The output of the counter 21 is sent to the processing control circuit 2, where it is operated on and processed for display as a measured value on a display device 29.

In the above-described construction, the 72 KHz input signal of the fifth NAND gate 9 and the third NAND gate 5 are used in common as well as the 75 KHz input signal of the sixth NAND gate 10 and the second NAND gate 4 are used in common. This arrangement makes it possible to construct the optical wave range finder of the present invention of substantially the same circuitry as that of the optical wave range finder that employs only two modulated waves, though the device of the present invention uses three modulated waves. Thus, the present invention provides a great advantage in circuit construction.

Description will now be made on the operation of the embodiment shown in the drawing.

(1) In the processing control circuit 2, the signal $S_1$ is made a "1". The light-emitting diode 23 radiates a 15-MHz modulated wave. Accordingly, the output of the amplification circuit 26 is a 15 MHz signal. Since the output of the second selection circuit 7 is a 14.997 MHz signal, the output of the second mixer 27 is 15 MHz−14.997 MHZ=3 KHz. This 3 KHz signal is converted into the rectangular wave by the wave-shaping device 28 and is sent to the stop terminal 213 of the counter 21. A phase difference develops between the signal applied to the start terminal 212 of the counter 21 and the signal applied to its stop terminal 213. The phase difference of the 3 KHz is the same as that of 15 KHz, and it corresponds to the distance measured with 20 m wavelength between the light-emitting diode 23 (or the light-receiving diode 25) and the reflector 25.

(2) In the processing control circuit 2, the signal $S_2$ is made a "1". The light-emitting diode 23 radiate 75 KHz modulated wave. Accordingly, the output of the amplification circuit 26 is a 75 KHz signal. Since the output of the second selection circuit 7 is 72 KHz, the output of the second mixer 27 is 75 KHz−72 KHz=3 KHz. This 3 KHz signal is converted into the rectangular wave by the wave-shaping device 28 and is then delivered to the stop terminal 213 of the counter 21. A phase difference develops between the signal applied to the start terminal 212 of the counter 21 and the signal applied to its stop terminal 213. The phase difference of the 3 KHz is the same as that of 75 KHz, and it corresponds to the distance measured with 4 km wave length between the light-emitting diode 23 (or the light-receiving diode 25) and the reflector 24.

(3) In the processing control circuit 2, the signal $S_3$ is made a "1". The light-emitting diode 23 radiate 72 KHz modulated wave. Accordingly, the output of the amplification circuit 26 is a 72 KHz signal. Since the output of the second selection circuit 7 is 75 KHz, the output of the second mixer 27 is 75 KHz−72 KHz=3 KHz. This 3 KHz signal is converted into the rectangular wave by the wave-shaping device 28 and is then delivered to the stop terminal 213 of the counter 21. A phase difference develops between the signal applied to the start terminal 212 of the counter 21 and the signal applied to the stop terminal 213. The phase difference of the 3 KHz is the same as that of 72 KHz, and it corresponds to the distance measured with 4.17 km wave length between the light-emitting diode 23 (or the light-receiving diode 25) and the reflector 25. However, since the output signal of the amplification circuit 26 is subtracted from the output signal of the second selection circuit 7 in the second mixer 27, the phase of the stop terminal 213 with respect to the start terminal 212 of the counter 21 is negative (the phase advances with an increasing distance to be measured) and hence, is different from the cases (1) and (2). Accordingly, when the measurement is carried out while the signal $S_3$ is a "1" in the processing control circuit 2, the processing is such that the counted value indicative of the measured result is subtracted from the counted value corresponding to $2\pi$.

Next, the calculation steps for calculating the distance to be measured in the processing control circuit will be described.

The steps for calculating the distance to be measured in this embodiment are as follows:

(1) first calculation step (very rough measurement value calculation step)

The very rough measurement value is calculated from the difference between the phase $\theta_{75}$ measured with the modulated wave of the 75 KHz frequency and the phase $\theta_{72}$ measured with the modulated wave of the 72 KHz frequency. $\theta_{75}$ and $\theta_{72}$ can be expressed as follows with L representing the distance to be measured:

$$\theta_{75} = \frac{2\pi L}{4000 \times \frac{1}{2}} \quad (12)$$

$$\theta_{72} = \frac{2\pi L}{\frac{3 \times 10^8}{72 \times 10^3} \times \frac{1}{2}} \quad (13)$$

The phase difference $\theta_L$ between $\theta_{75}$ and $\theta_{72}$ is determined from:

$$\theta_L = \theta_{75} - \theta_{72} = \frac{2\pi L}{50000} \text{ (m)} \quad (14)$$

This is equal to the phase measurement using a wavelength of $2 \times 50,000$ m = 100 Km; consequently, measurement is possible within a range of 50 Km.

The very rough measurement value $L_1$ is the calculated using Eq. (14):

$$L_1 = \frac{50000}{2\pi} (\theta_{75} - \theta_{72}) \text{ (m)} \quad (15)$$

It should be noted that the following relationship is established from Eqs. (12) and (13):

$$\theta_{75} > \theta_{72} \quad (16)$$

The measured values of $\theta_{75}$ and $\theta_{72}$ are within the range of 0 to $2\pi$. There are instances where a negative value is indicated by Eq. (15). For example, this occurs when $\theta_{72}$ is slightly less than $2\pi$, with $\theta_{75}$ having a value slightly larger than $2\pi$, i.e., slightly greater than zero.

In this case, the very rough measurement value is calculated by use of the following equation instead of Eq. (15):

$$L'_1 = \frac{50000}{2\pi} (2\pi + \theta_{75} - \theta_{72}) \text{ (m)} \quad (17)$$

(2) second calculation step (rough measurement value calculation step)

The rough measurement value $L_2$ is calculated from $\theta_{75}$ in accordance with Sq. (12);

$$L_2 = \frac{2000}{2\pi} \theta_{75} \text{ (m)} \quad (18)$$

(3) fine measurement value calculation step

The fine measurement value $L_s$ is calculated in accordance with the following equation, with $\theta_s$ representing the phase when the measurement is carried out using the modulated wave of the 15 MHz frequency:

$$L_s = \frac{10}{2\pi} \theta_s \text{ (m)} \quad (19)$$

(4) first synthesizing step (synthesis of the very rough measurement value and the rough measurement value)

The first synthesizing step is accomplished by the following items (a) and (b):

(a) first correction-synthesizing step:

Using the rough measurement value as the reference, the very rough measurement value is changed within a predetermined range, i.e., ±400 m, and is so determined as to establish coincidence in Km units in terms of an odd or even number, and coincidence in 100 m units. Synthesis is carried out using the value of the determined very rough measurement for digits higher than the 100 m digit and using the value of the rough measurement for digits below or equal the 100 m digit. The results of synthesis are used as the first synthetic measurement value.

(b) first determination step

When the very rough measurement value is changed, determination is made in the abovementioned manner whether or not the very rough measurement value coincides with the rough measurement value with respect to the perticular digit within the predetermined range; when they do not, the measurement is carried out again or a signal indicative of an abnormality is generated.

(5) second synthesizing step (synthesis of first synthetic measurement value and fine measurement value)

This is accomplished by the following items (a) and (b).

(a) second correction synthetic step

Using the fine measurement value as the reference, the first synthetic measurement value is changed within a predetermined range, i.e., ±2 m, and the first synthetic measurement value is so determined as to coincide in the 1 m digit. The first synthetic measurement value thus determined is used for the synthesis of the 10 m digit or higher, while the value of the fine measurement value is used for the synthesis of the digit of 1 m or below. The results thus synthesized are the final measurement value of the distance.

(b) second determination step

When the first synthetic measurement value is changed, determination is made as to whether or not the 1 m digit of first synthetic measurement value coincides with that of the fine measurement value within a predetermined range; when they do not, the measurement is carried out again or a signal indicative of an abnormality is generated.

In accordance with the above-described steps, the final measured distance is calculated and is then displayed. These calculation steps for the measurement values are carried out by a microprocessor including the processing control circuit 2.

Next, in the abovementioned embodiment, the case in which a varying distance is to be measured will be described. It will be first considered that the distance to be measured changes during the period from the fine measurement using the 15 MHz first modulation wave to the measurement using the 75 KHz second modulation frequency. In this case, if the change in the distance to be measured is less than ½ of the measuring period of the fine measurement, that is, less than 5 m, no measurement error will occurs. Next, we consider a distance change allowable in the period from the measurement using the 75 KHz second modulated wave to the measurement using the 72 KHz third modulation wave. If the phase measured by the 75 KHz of second modulated wave is $\theta_{75}$ and that by the 72 KHz of third modulated wave is $\theta_{72}$, the amount of change in the phase, $S_{\theta L}$ at which the result of the very rough measurement to be determined from the difference between $\theta_{75}$ and $\theta_{72}$ does not cause the measurement error of 2 km/2=1 Km, is given as follows from Eq. (14):

$$S_{\theta L} = \frac{2\pi}{50000} \times 1000 = \frac{2\pi}{50} \quad (22)$$

Assuming that the distance to be measured changes by $\Delta L$ during period from the measurement of $\theta_{75}$ to the measurement of $\theta_{72}$, the following equation is established from Eq. (13):

$$\theta'_{72} = \frac{2\pi}{\frac{3 \times 10^8}{72 \times 10^3}/2} (L + \Delta L) \quad (23)$$

Hence, the phase difference $\theta'_L$ between $\theta_{75}$ and $\theta_{72}'$ is given by the following equation from Eqs. (12) and (23):

$$\theta'_L = \frac{2\pi L}{50000} - \frac{2\pi \Delta L}{\frac{3 \times 10^8}{72 \times 10^3}/2} \quad (24)$$

The amount of change in the phase $\Delta\theta_L$ due to the change of the distance by $\Delta L$ becomes as follows from Eqs. (14) and (24):

$$\theta_L = \theta_L - \theta'_L = \frac{2\pi \Delta L}{\frac{3 \times 10^8}{72 \times 10^3}/2} \quad (25)$$

In order for the very rough measurement value obtained from the difference between $\theta_{75}$ and $74_{72}$ to have a stability of 1 Km or below, the following condition must be satisfied from Eqs. (22) and (25):

$$\frac{2\pi}{\frac{3 \times 10^8}{72 \times 10^3}/2} \Delta L < \frac{2\pi}{50}, \Delta L < \frac{\frac{3 \times 10^8}{72 \times 10^3}/2}{50} = 41.7 \text{ m}$$

In other words, no erroneous measurement occurs in the very rough measurement if the change of distance is within 41.7 m during period from the measurement of $\theta_{75}$ to the measurement of $\theta_{72}$. Namely, this is more advantageous than the change of distance within 5 m that is allowed during period from the fine measurement to the measurement of $\theta_{75}$.

We claim:

1. In an electro-optical range finder including:
    projector means for radiating a ray of light having a given modulation frequency;
    light-receiving means for receiving the ray of light reflected by a reflector positioned at a measuring point and for converting it into an electric signal;
    a mixer for mixing the electric signal from said light-receiving means and a reference signal; and
    an arithmetic circuit for computing the distance between the measuring point and the range finder positioned at a setting point by the change in phases between the signal from said mixer and a divided signal of said modulation frequency;
    the improvement wherein said projector means further includes means for selectively radiating the rays of light with first, second and third modulation frequencies which are different from each other, said first modulation frequency having a value at least ten times higher than said second and third modulation frequencies, and said second and third modulation frequencies being approximations to each other within a maximum limit of ±20%.

2. The electro-optical range finder according to claim 1 wherein said reference signal is composed of second, third and fourth reference signals and each is so determined as to satisfy the following equation:

$$f_4 = f_1 \pm |f_2 - f_3|$$

where $f_1$ is the first frequency of the electric signal forming said first modulation frequency; $f_2$ is the second frequency of the electric signal forming said second modulation frequency and said second reference signal; $f_3$ is the third frequency of the electric signal forming said third modulation frequency and said third reference signal; and $f_4$ is the fourth frequency of the electric signal forming said fourth reference signal.

3. The electro-optical range finder according to claim 2 which further includes:
    a first selection circuit for selecting one frequency from said first, second and third frequencies $f_1$, $f_2$ and $f_3$; and
    a second selection circuit for selecting one frequency from said second, third and fourth frequencies $f_2$, $f_3$ and $f_4$; and
    a processing control circuit for generating combination control signals so that:
    (a) when said first selection circuit selects said first frequency $f_1$, said second selection circuit selects said fourth frequency $f_4$;

(b) when said first selection circuit selects said second frequency $f_2$, said second selection circuit selects said third frequency $f_3$; and (c) when said first selection circuit selects said third frequency $f_3$, said second selection circuit selects said second frequency $f_2$;

whereby the frequency selected by said first selection circuit forms a modulation frequency corresponding thereto and the frequency selected by said second selection circuit forms a reference signal corresponding thereto.

4. The electro-optical range finder according to claim 2 wherein said second, third and fourth frequencies $f_2$, $f_3$ and $f_4$ are produced by frequency dividing means for dividing the frequency of said first frequency $f_1$.

* * * * *